United States Patent [19]
Seufert et al.

[11] Patent Number: 6,085,884
[45] Date of Patent: Jul. 11, 2000

[54] ACTUATING ELEMENT FOR A CLUTCH ACTUATED BY PRESSURE MEDIUM

[75] Inventors: Robert Seufert, Oerlenbach; Thomas John, Sulzheim, both of Germany

[73] Assignee: Mannesmann Sachs AG, Schweinfurt, Germany

[21] Appl. No.: 09/291,084

[22] Filed: Apr. 14, 1999

[30] Foreign Application Priority Data

Apr. 14, 1998 [DE] Germany ............... 198 16 513

[51] Int. Cl.⁷ ................................. F16D 25/12
[52] U.S. Cl. ............ 192/85 C; 192/30 W; 192/111 A; 92/13; 92/13.4
[58] Field of Search .............. 192/30 W, 85 R, 192/85 C, 91 R, 111 A; 92/13, 13.4, 19; 188/196 P, 196 B

[56] References Cited

U.S. PATENT DOCUMENTS

| | | | |
|---|---|---|---|
| 3,117,661 | 1/1964 | Waclawek | 192/111 A X |
| 3,321,913 | 5/1967 | Harrah | |
| 3,468,405 | 9/1969 | Gardener et al. | 192/91 R X |
| 3,908,804 | 9/1975 | Cochran | 188/196 B X |
| 4,556,137 | 12/1985 | Abe | 192/111 A |
| 4,705,151 | 11/1987 | Leigh-Monstevens et al. | 192/111 A |

FOREIGN PATENT DOCUMENTS

| | | |
|---|---|---|
| 0 354 268 | 2/1990 | European Pat. Off. . |
| 2 483 022 | 11/1981 | France . |
| 1 675 136 | 4/1971 | Germany . |
| 1003331 | 9/1965 | United Kingdom . |
| 97/42426 | 11/1997 | WIPO . |

*Primary Examiner*—Richard M. Lorence
*Attorney, Agent, or Firm*—Cohen, Pontani, Lieberman & Pavane

[57] ABSTRACT

An actuating element for a clutch includes a stop which is adjustable by an automatic adjusting device for ensuring that the actuating stroke of a piston increases in the releasing direction of the clutch and that the actuating stroke is displaced away from the clutch in response to wear of the clutch linings when the clutch is engaged.

5 Claims, 2 Drawing Sheets

ACTUATING ELEMENT FOR A CLUTCH ACTUATED BY PRESSURE MEDIUM

BACKGROUND OF THE INVENTION

1. Field of the Invention

The invention is directed to an actuating element for a clutch which is actuated by pressure medium, and includes a slave cylinder, a piston that is displaceable in the slave cylinder by the action of pressure medium and a tappet abutting the piston for actuation of a clutch release lever.

2. Description of the Related Art

A prior art pneumatically operating actuating element is disclosed in European reference EP 0 453 749. As is the case with actuating elements which are designed for use with clutches, the piston is at a distance from a rear wall of the slave cylinder housing when the clutch is engaged. Due to wear of the clutch linings, the piston is increasingly displaced toward the rear wall by the tappet supported on it when the clutch is engaged. The lift or stroke area of the piston between the release position and engaging position of the clutch is increasingly shifted in a direction opposite to the actuating direction as the piston is displaced toward the rear wall. Undesirably large release paths of the clutch which may lead to excessive pressing of the clutch spring are prevented in this known actuating element by a distance or path sensor at the actuating element which detects the actuating path of the piston in the driver housing independently from the wear of the clutch linings.

In practice, hydraulically operating actuating elements do not use electronic means for limiting the release path. Rather the slave cylinder is usually actuated by a clutch master cylinder whose piston is movable against a mechanical stop for limiting the maximum amount of pressure medium conveyed into the slave cylinder of the clutch. However, a master cylinder of this type is relatively expensive. It is desirable to apply pressure medium to the slave cylinder directly from a pressure medium source via a clutch valve.

SUMMARY OF THE INVENTION

It is an object of the present invention to construct a pressure medium actuatable actuating element for a clutch such that excessive pressing of the clutch is prevented regardless of the pressure medium supplied to it and without expenditure on electronics.

This problem is solved according to the present invention by a stop on the clutch side of the piston for defining the maximum possible stroke of the piston in the release direction and by an automatic adjusting device in the slave cylinder for displacing the stroke area of the tappet depending on the wear of the clutch lining and accordingly depending on the return stroke of the tappet during clutch engagement.

An actuating element according to the invention prevents a stroke going beyond the distance defined by the clutch-side stop during the release of the clutch. Accordingly, an overpressing of the clutch spring is dependably prevented. Since the stroke area of the tappet actuating the clutch is displaced by the automatic adjusting device depending on the wear of the clutch lining, this stride area and the release paths limited by the stop always remain the same regardless of wear. The automatic adjusting device simultaneously allows for compensation of manufacturing tolerances before the clutch is first put into operation.

The tappet actuating the clutch is increasingly displaced toward the actuation side in the engagement position of the clutch due to the increasing lining wear. To make this displacement possible, the piston in the slave cylinder in the engaged state of the actuating element is usually located in an intermediate position between the release position and a rear stop of the slave cylinder. Accordingly, the piston can be displaced increasingly opposite to the actuating direction as lining wear increases. When the stop on the clutch side of the slave cylinder is stationary, the maximum possible release path becomes steadily greater, so that the problem of an overpressing of the clutch spring can occur in spite of the stop. To avoid this type of shortcoming, an adjusting device for adjusting the stop on the clutch side is constructed opposite to the actuating direction of the piston. The adjusting device allows the stop to be displaced opposite to the actuating direction of the actuating element to the extent that the engagement position of the clutch is displaced, so that the maximum possible stroke of the actuating element always remains the same.

The adjusting device may comprise a plurality of sawtooth-shaped grooves arranged one behind the other in the slave cylinder such that the adjacent grooves have, considered in the actuation direction, a first flank leading into the slave cylinder at a right angle and, opposite thereto, a flatly ascending second flank. The adjusting device further comprises a stop for the piston which fits in one of the grooves. This stop is constructed as a securing ring. The adjusting device further includes a repositioning or readjusting disk which is fastened to the tappet so as to be fixed against axial displacement and which is movable against the stop during the engagement stroke of the tappet.

The clutch can work in an optimum manner depending on different parameters, especially the rate of rotation of the engine and transmission, and can further avoid unnecessarily large releasing paths when the piston comprises a sensor magnet and a path sensor which responds to a magnetic field is arranged outside of the slave cylinder housing.

In a further embodiment leaving a path sensor, the piston is formed of an outer piston which is sealed relative to the slave cylinder housing by of a first seal and an inner piston which is sealed relative to the outer piston by a second seal. The inner piston supports the tappet, wherein the inner piston and the outer piston are displaceable jointly in the release direction of the clutch by the application of pressure to the slave cylinder housing. When the clutch is engaged the outer piston on the side remote of the actuating direction rests against a stop of the slave cylinder. The stop is fixed with respect to the housing. The adjusting device is formed by a ratchet connection such, for example, as a positive engagement or by a frictional engagement of the inner piston with the outer piston which allows a displacement of the inner piston relative to the outer piston in the engagement direction of the clutch. In an embodiment form of this kind, only the stroke area of the tappet is displaced as a result of lining wear, but not the stroke area of the outer piston. The path which is displaced by the lining wear is not the path detected by the path sensor. Therefore, the path sensor may be made as a shorter sensor than in the first embodiment.

In a particularly simple embodiment form for the positive engagement of an outer piston with an inner piston, the adjusting device is formed by adjacent sawtooth-shaped grooves in the outer piston and by a locking pawl in the inner piston, which locking pawl engages in one of the grooves in each instance.

Another simple construction for a frictional engagement of an outer piston with an inner piston consists in that the adjusting device is effected by friction between the outer piston and inner piston via a friction element which is axially connected with the inner piston and generates a friction with maximum holding force against a cylindrical inner surface of the outer piston. This holding force is exceeded when the inner piston is displaced relative to the outer piston.

The invention allows numerous embodiment forms. Two of these embodiment forms are shown in the drawing and described hereinafter in order to further illustrate the basic principle of the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
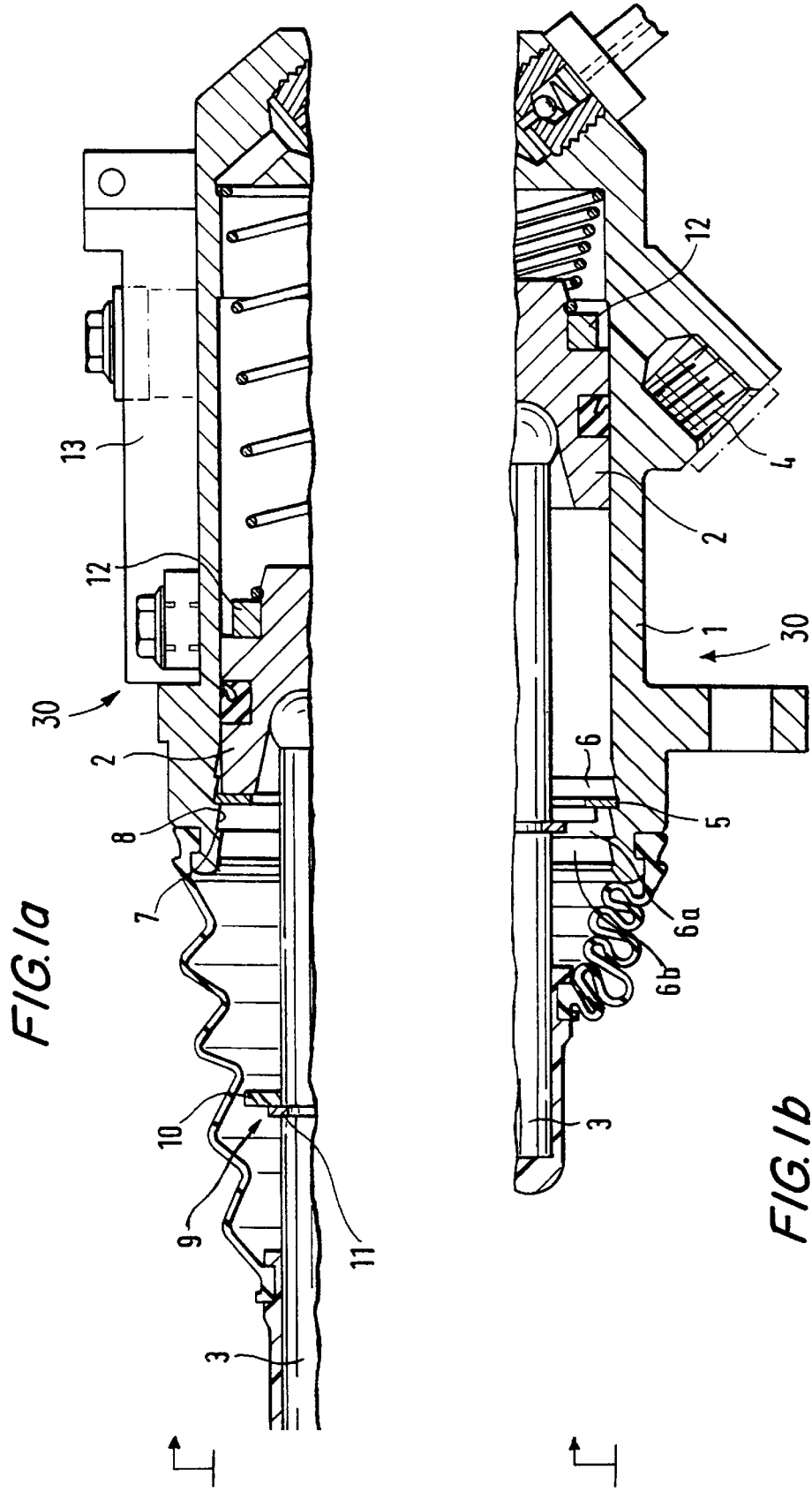
FIG. 1a is a partial longitudinal sectional view of the upper half of an actuating element according to an embodiment of the present invention in the disengaged position.
FIG. 1b is a partial longitudinal sectional view of the lower half of an actuating element according to the embodiment of FIG. 1a in the engaged position.

An actuating element 30 according to an embodiment of the present invention is shown in FIGS. 1a and 1b. The actuating element 30 has a slave cylinder 1 in which a piston 2 is arranged so as to be displaceable. This piston 2 rests against a tappet 3 by which a clutch release lever, not shown, is actuatable. In FIG. 1b, the piston 2 and the tappet 3 are shown in the position resulting when the clutch is engaged. In FIG. 1a the piston 2 and the tappet 3 are shown in the position resulting when the clutch is disengaged. For applying pressure to the tappet 3, the slave cylinder 1 has a hydraulic connection 4 connectable with a clutch valve (not shown) for receiving a hydraulic pressure. A master cylinder is not necessary in the actuating element 30 according to the present invention.

An important feature of the invention is a stop 5 which is formed by a securing ring arranged in the slave cylinder 1. The piston 2 rests against the stop 5 when it has been displaced to a maximum extent in the release position of the clutch. This stop 5 fits in one of three grooves 6, 6a, 6b arranged one behind the other in the slave cylinder 1. Each of these grooves 6, 6a, 6b has first a flank 7 and a second flank 8. The first flank 7 is on a side of the grooves 6, 6a, 6b facing tappet 3 and leads into the slave cylinder 1 at right angles. The second flank 8 on the other side of the groove facing away from the tappet 3 which ascends smoothly opposite to the actuating direction. Due to this arrangement of the grooves 6, 6a, 6b, the stop 5 can initially be inserted in the left most groove 6b with reference to FIGS. 1a and 1b. When lining wear occurs, the stop 5 is displaced initially into the groove 6a and, with further wear of the lining of the clutch, into groove 6a. This displacement of the stop 5 is automatically performed by an adjusting device 9 including a readjusting disk 10 arranged on the tappet 3. A securing ring 11 is arranged on the tappet 3 so as to be fixed against displacement on a side of the readjusting disk 10 facing the clutch.

In new clutch linings, the stop 5 is initially inserted in the groove 6b on the clutch side. The readjusting disk 10 is at a distance from this stop 5 such that it does not contact it when the clutch is disengaged. In response to wear of the clutch lining, the piston 2 is increasingly displaced to the right, with reference to FIGS. 1a and 1b, when the clutch is engaged. When the lining wear reaches a certain extent, the readjusting disk 10 moves against the stop 5 during the rearward movement of the tappet 3 and displaces it into the next groove 6a, so that the path of the piston 2 toward the clutch is shortened in the release direction by the distance between grooves 6a and 6b.

In order to detect the displacement of the piston 2, the piston 2 has a sensor magnet 12 whose magnetic field is detected by a path sensor 13.

Figure 2:
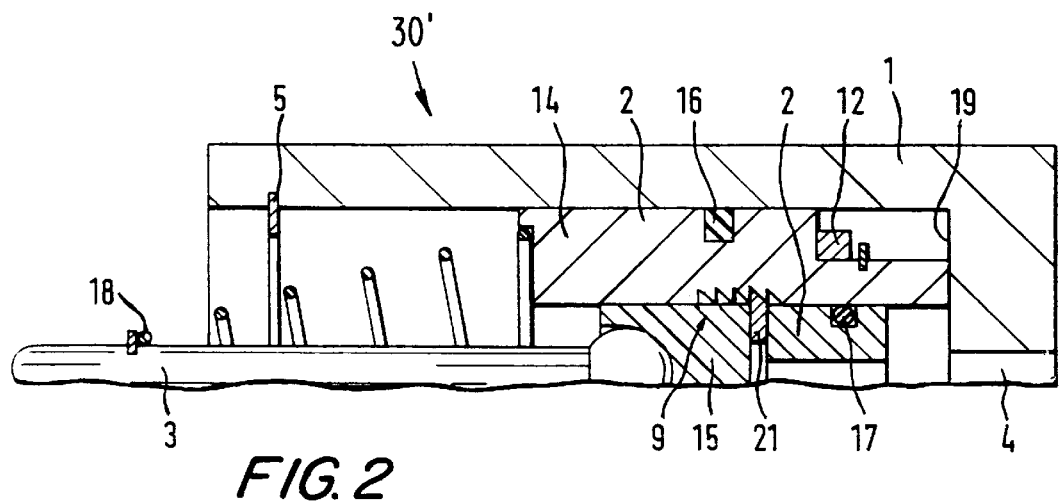
FIG. 2 is a longitudinal sectional view of the upper half of an actuating element according to another embodiment of the present invention.

In the embodiment form of an actuating element 30' according to FIG. 2, the piston 2 comprises an outer piston 14 and an inner piston 15 of smaller cross section. The outer piston 14 is sealed by a seal 16 relative to the slave cylinder 1 and the inner piston 15 is sealed relative to the outer piston 14 by of a seal 17. The tappet 3 is supported exclusively in the inner piston 15. As shown in FIG. 2, the outer piston 14 is pretensioned against a rear stop 19 by a pressure spring 18 which is supported between the tappet 3 and the outer piston 14. The stop 19 is formed by the rear end wall of the slave cylinder 1. The stroke of the outer piston 14 is limited in the actuating direction by the stop 5.

An inner surface of the outer piston 14 has a plurality of sawtooth-shaped successive circumferential grooves 20 as part of the adjusting device 9. A locking pawl 21 arranged on the inner piston 15 engages one of the grooves 20.

In the case of new clutch linings, the locking pawl 21 initially engages in the groove 20 at far left in FIG. 2. When the tappet 3 exhibits an increased return stroke due to lining wear, the inner piston 15 with the tappet 3 is capable of displacing farther toward the right, that is, opposite to the actuating direction of the clutch after the outer piston 14 rests against the stop 19. Where the lining wear is long enough, the locking pawl 21 is capable of moving into a groove 20 located to the right of the currently engaged groove.

Figure 3:
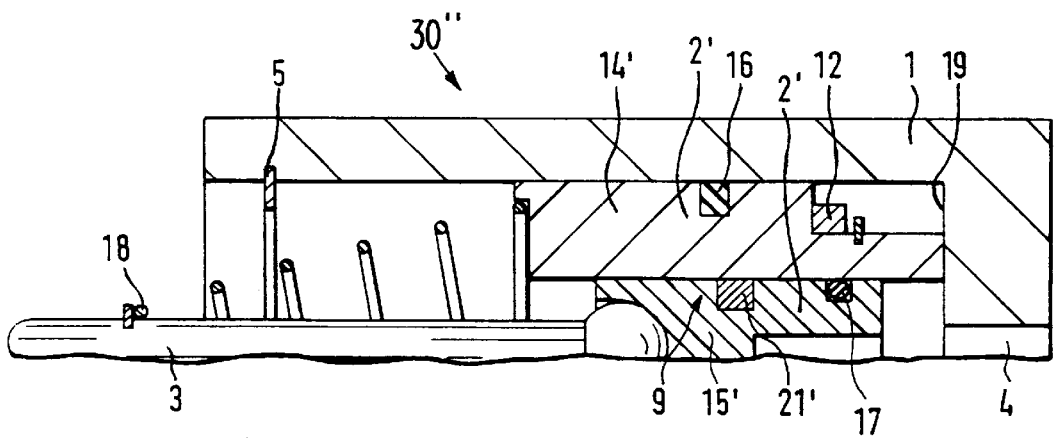
FIG. 3 is a longitudinal sectional view of the upper half of an actuating element according to yet another embodiment of the present invention.

In the embodiment of an actuating element 30" according to FIG. 3, a piston 2' comprises an outer piston 14' and an inner piston 15' of smaller cross section. The outer piston 14' is sealed relative to the slave cylinder 1 by a seal 16 and the inner piston 15' is sealed relative to the outer piston 14' by of a seal 17. The tappet 3 is supported exclusively in the inner piston 15'. As shown in FIG. 3, the outer piston 14' is pretensioned against a rear stop 19 by a pressure spring 18 supported between the tappet 3 and the outer piston 14'. The rear stop 19 is formed by the rear end wall of the slave cylinder 1. The stroke of the outer piston 14' is limited in the actuating direction by the stop 5. The inner piston 15' has a clamping element 21' which is fixedly connected with the inner piston 15' in the axial direction and presses against the cylindrical inner surface of the outer piston 14' so that a relative displacement of the outer piston 14' relative to the inner piston 15' is possible only after the reference holding force has been overcome.

In the case of new clutch linings, the clamping element 21' holds the inner piston 15', according to FIG. 3, at the far left in the outer piston 14'.

When the tappet 3 executes an increased return stroke due to lining wear, the inner piston 15' with the tappet 3 is capable of displacing farther toward the right, that is, opposite to the actuating direction of the clutch after the outer piston 14' rests against the stop 19. The clamping element 21' and the inner piston 15' are displaced farther to the right within the outer cylinder 14' to compensate for the increased wear of the linings.

In the embodiment form according to FIG. 2, the sensor magnet 12 is arranged at the outer piston 14. Since the outer piston always moves against the stop 19 during engagement, the outer piston 14 always moves into an identical area during actuation of the clutch, so that the path sensor 13, not shown in FIG. 2, can be constructed so as to be especially short.

The invention is not limited by the embodiments described above which are presented as examples only but can be modified in various ways within the scope of protection defined by the appended patent claims.

We claim:

1. An actuating element for a clutch, comprising:

a cylinder having a longitudinal axis, a closed end, and an open end;

a piston axially displaceable within said cylinder and defining a working chamber in said cylinder between said piston and said closed end of said cylinders said working chamber hydraulically connectable to a pressure medium supply;

a tappet arranged adjacent said piston such that said piston is supported against said tappet for actuating a clutch release lever in response to the pressure medium supply, said tappet being axially movable within a range of movement by said piston;

a stop mounted in said cylinder for limiting a displacement of said piston toward said open end of said cylinder, wherein said piston occupies an intermediate position between said stop and said closed end of said cylinder;

an automatic adjusting device operatively arranged in said cylinder for axially adjusting a position of said range of movement of said tappet;

wherein said cylinder comprises an inner surface having a plurality of axially adjacent circumferential grooves, each said grooves having a first flank facing said closed end of said cylinder and a second flank facing said open end of said cylinder, said first flank being arranged substantially perpendicular to said longitudinal axis of said cylinder and said second flank gradually ascending from a bottom of said each said grooves toward a top of an adjacent one of said each of said grooves, said stop being inserted in one of said plural grooves; and said adjusting device being arranged on a side of said step facing said open end of said cylinder for adjusting a position of said stop and comprising a readjusting disk axially fixedly mounted on said tappet and movable with said tappet against said stop as said tappet moves toward said closed end of said cylinder.

2. The actuating device of claim 1, further comprising a sensor magnet mounted on said piston; and a path sensor mounted outside of said [slave] cylinder for sensing a magnetic field of said sensor magnet.

3. An actuating element for a clutch, comprising:

a cylinder having a longitudinal axis, a closed end, and an open end;

a piston axially displaceable within said cylinder and defining a working chamber in said cylinder between said piston and said closed end of said clinder, said working chamber hydraulically connectable to a pressure medium supply;

a tappet arranged adjacent said piston such that said piston is supported against said tappet for actuating a clutch release lever in response to the pressure medium supply, said tappet being axially movable within a range of movement by said piston;

a stop mounted in said cylinder for limiting a displacement of said piston toward said open end of said cylinder; and an automatic adjusting device operatively arranged in said cylinder for axially adjusting a position of said range of movement of said tappet;

wherein said piston comprises an outer piston sealably axially movable in said cylinder and an inner piston sealably axially movable within said outer piston, said tappet being supported on said inner piston, said outer piston and said inner piston being jointly displaceable toward said open end of said cylinder in response to said pressure in said working chamber;

said outer piston resting against a rear stop at said closed end of said cylinder when said tappet is in an clutch engaged position; and said adjusting device comprising a ratchet connection operatively connected between said inner piston and said outer piston such that said inner piston is displaceable with said tappet relative to said outer piston toward said closed end of said cylinder and said inner piston is prevented from being displaced toward said open end of said cylinder relative to said outer piston.

4. The actuating element of claim 3, wherein said adjusting device comprises adjacently arranged circumferential grooves on an inner surface of said outer piston and a locking pawl mounted on said inner piston such that said locking pawl engages one of said grooves.

5. The actuating element of claim 3, wherein said adjusting device comprises a clamping element fixedly connected to said inner piston, said clamping element effecting a frictional engagement with said outer piston for allowing displacement of said inner piston toward said closed end of said cylinder relative to said outer piston in response to wear of said friction linings and preventing movement of said inner piston toward said open end relative to said outer piston.

* * * * *